US012534323B2

(12) United States Patent
Totsuka

(10) Patent No.: US 12,534,323 B2
(45) Date of Patent: Jan. 27, 2026

(54) IMAGE FORMING APPARATUS, CONTROL METHOD FOR IMAGE FORMING APPARATUS, AND STORAGE MEDIUM

(71) Applicant: CANON KABUSHIKI KAISHA, Tokyo (JP)

(72) Inventor: Satoshi Totsuka, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/819,452

(22) Filed: Aug. 29, 2024

(65) Prior Publication Data

US 2025/0074731 A1 Mar. 6, 2025

(30) Foreign Application Priority Data

Sep. 6, 2023 (JP) ................................ 2023-144757

(51) Int. Cl.

| | |
|---|---|
| ***B65H 7/18*** | (2006.01) |
| ***B65H 3/08*** | (2006.01) |
| ***B65H 7/14*** | (2006.01) |
| ***B65H 7/20*** | (2006.01) |
| ***G03G 15/00*** | (2006.01) |

(52) U.S. Cl.

CPC ................ *B65H 7/14* (2013.01); *B65H 3/08* (2013.01); *B65H 7/18* (2013.01); *B65H 7/20* (2013.01); *G03G 15/6511* (2013.01); *G03G 15/6591* (2013.01); *B65H 2551/21* (2013.01); *B65H 2701/12* (2013.01); *B65H 2801/06* (2013.01); *G03G 2215/004* (2013.01); *G03G 2215/00548* (2013.01)

(58) Field of Classification Search

CPC ... B65H 7/02; B65H 7/14; B65H 7/16; B65H 7/18; B65H 7/20; B65H 3/08; B65H 3/48; B65H 2511/414; B65H 2511/416

See application file for complete search history.

(56) References Cited

U.S. PATENT DOCUMENTS

| | | | | |
|---|---|---|---|---|
| 7,823,875 | B2 * | 11/2010 | Fukatsu | B65H 3/48 271/265.04 |
| 10,921,740 | B2 * | 2/2021 | Sasaki | B41J 29/38 |
| 2019/0253575 | A1 * | 8/2019 | Wei | G03G 15/2039 |
| 2024/0286857 | A1 * | 8/2024 | Kawakita | B65H 29/00 |
| 2025/0036062 | A1 * | 1/2025 | Tai | G03G 15/5016 |
| 2025/0128898 | A1 * | 4/2025 | Matsumura | G03G 15/5016 |

FOREIGN PATENT DOCUMENTS

| | | |
|---|---|---|
| JP | 2010032632 A | 2/2010 |

* cited by examiner

*Primary Examiner* — Howard J Sanders
(74) *Attorney, Agent, or Firm* — Canon U.S.A., Inc., IP Division

(57) ABSTRACT

Provided are an image forming apparatus and methods for controlling the apparatus, which includes a central processing unit (CPU) configured to set whether to operate an air blowing fan before a paper type detection sensor detects a type of sheet. In a case where a setting to blow the air is made by the CPU, the air blowing fan blows the air when a sheet feed unit feeds the sheet before the paper type detection sensor detects the type of the sheet. In a case where a setting not to blow the air is made by the CPU, the air blowing fan does not blow the air when the sheet feed unit feeds the sheet before the paper type detection sensor detects the sheet type.

9 Claims, 9 Drawing Sheets

IMAGE FORMING APPARATUS, CONTROL METHOD FOR IMAGE FORMING APPARATUS, AND STORAGE MEDIUM

BACKGROUND

Field

The present disclosure relates to an image forming apparatus, a control method for the image forming apparatus, and a storage medium.

Description of the Related Art

There is known an image forming apparatus provided on a sheet conveyance path of the image forming apparatus with a paper type detection sensor (media sensor) for detecting a type of sheet, by measuring, for example, a feature amount such as a surface property or a grammage of a sheet. For example, in such an image forming apparatus, the type of sheet (e.g., paper type) is identified based on the feature amount of the sheet fed for the print job, using a paper type database (e.g., media library) stored in advance. Then, in such an image forming apparatus, print control parameters for the identified paper type are used for an image forming control to obtain a high-quality print product.

Further, there is discussed an image forming apparatus provided with an air blowing mechanism for separating adhering sheets to prevent double-feeding, by blowing air from an air blowing fan to a sheet bundle before feeding (i.e., air blowing separation). Japanese Patent Application Laid-open No. 2010-32632 discusses a technique of always performing the air blowing separation on the sheet bundle before being fed, before detecting the paper type of the sheet, and then continuing the air blowing separation in a case where the detected paper type is a coated paper with a high possibility of double-feeding, and stopping the air blowing separation in a case where the paper type is not the coated paper.

However, the technique discussed in Japanese Patent Application Laid-open No. 2010-32632 always performs the air blowing separation before detecting the paper type. Thus, when for paper types that do not include coated paper with a high possibility of double-feeding, the time for the above-described air blowing separation is wasteful, which may reduce sheet printing efficiency.

SUMMARY

The present disclosure overcomes shortcomings in conventional systems while preventing a deterioration in sheet printing efficiency.

An aspect of the present disclosure provides an image forming apparatus that includes an imager configured to print at least one image on one or more sheets, a sheet feeder configured to feed the one or more sheets to the imager via a sheet conveyance path from a sheet feed tray configured to stack the one or more sheets, a blower configured to blow air onto the one or more sheets stacked on the sheet feed tray, a sensor provided along the sheet conveyance path and configured to detect a sheet type of the one or more sheets, and a processor configured to set whether to blow the air from the blower before the sensor detects the sheet type. The blower blows the air when the sheet feeder feeds a sheet of the one or more sheets before the sensor detects the sheet type, in a case where a setting to blow the air is made by the processor. The blower does not blow the air when the sheet feeder feeds the sheet before the sensor detects the sheet type, in a case where a setting not to blow the air is made by the processor. Other aspects of the present disclosure provide corresponding methods and a non-transitory computer readable storage medium.

Further features of the present disclosure will become apparent from the following description of exemplary embodiments with reference to the attached drawings.

DESCRIPTION OF THE EMBODIMENTS

Hereinbelow, exemplary embodiments of the present disclosure will be described with reference to the attached drawings. In addition, the exemplary embodiments described below are merely examples, and the present disclosure is not limited to the exemplary embodiments described below.

<Schematic Configuration of Image Forming Apparatus>

Figure 1:
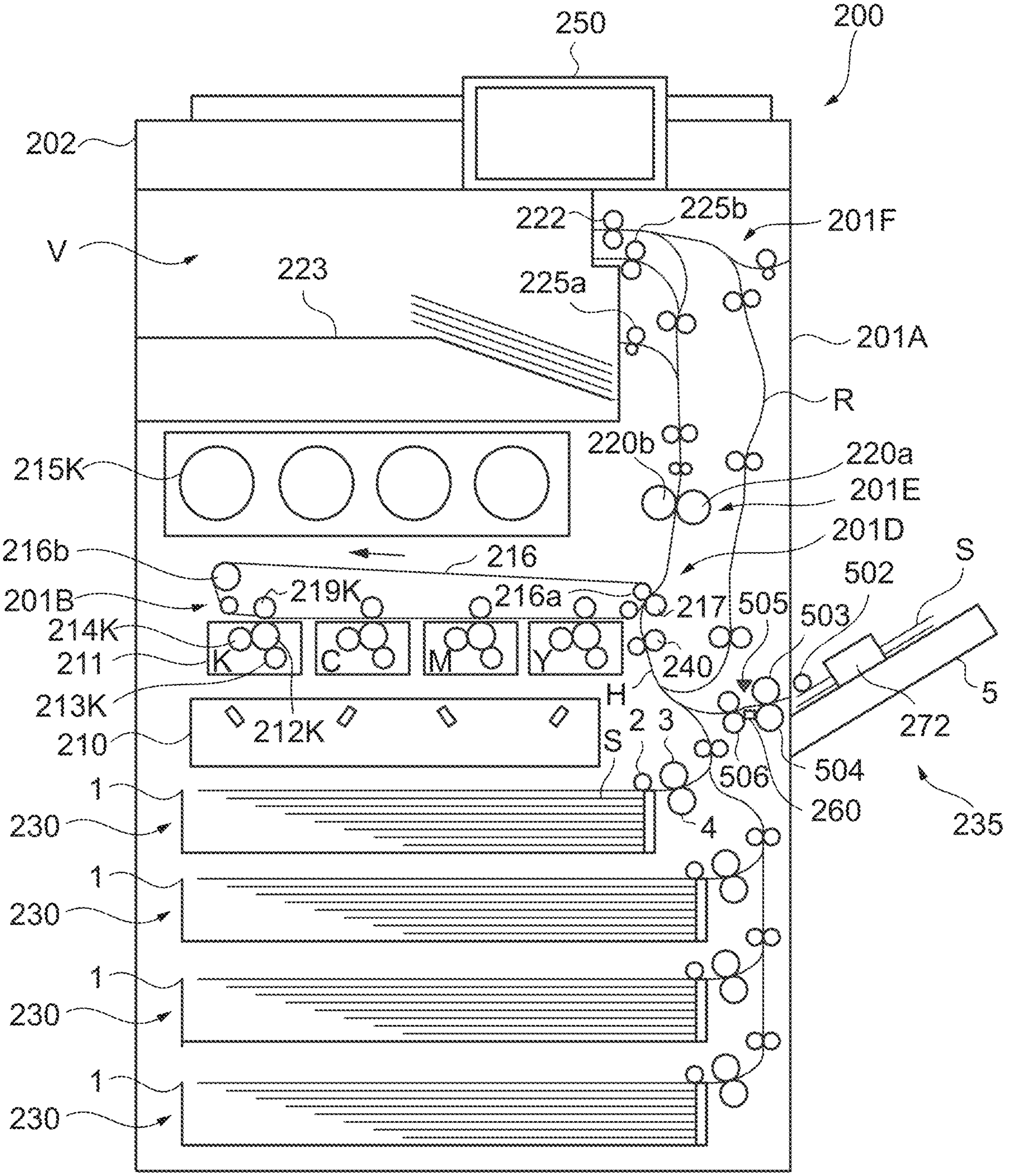
FIG. 1 is a cross-section diagram schematically illustrating an example of an image forming apparatus according to an exemplary embodiment of the present disclosure.

FIG. 1 is a cross-section diagram schematically illustrating an example of an image forming apparatus 200 according to an exemplary embodiment of the present disclosure.

The image forming apparatus 200 illustrated in FIG. 1 includes an image forming apparatus body 201A, an image reading apparatus 202, and a display, i.e., a display unit, 250.

The image forming apparatus body 201A includes an image forming unit 201B, i.e., an imager, for forming an image on a sheet S conveyed through a sheet conveyance path H. Further, the image forming apparatus body 201A includes cassette sheet feed units 230 for feeding sheets S from any of sheet feed cassettes 1 that are sheet storage units for storing the sheets S. Each of the cassette sheet feed units 230 is provided with a pickup roller 2 serving as a sheet feed unit, and a separation unit for separating the sheets S fed from the pickup roller 2, composed of a feed roller 3 and a retard roller 4. Further, the image forming apparatus body 201A includes a manual sheet feed unit 235 serving as a sheet feed unit for feeding the sheet S to the image forming unit 201B through the sheet conveyance path H from a manual sheet feed tray 5 for stacking and holding the sheets S. Similar to the cassette sheet feed units 230, the manual sheet feed unit 235 is provided with a pickup roller 502 serving as a sheet feed unit, and a feed roller 503 and a retard roller 504 serving as a separation unit. Further, the image forming apparatus body 201A includes an air blowing fan, serving as a blower or an air blowing unit, for blowing air to the sheets S stacked on the manual sheet feed tray 5, and in FIG. 1, an air blowing nozzle 272 included in the air blowing fan is illustrated. Further, the image forming apparatus body 201A includes a paper type detection sensor (media sensor) 260 for detecting a type of sheet by measuring a feature amount of the sheet S, and a sheet detection sensor 505 for detecting the sheet S, which are arranged on the sheet conveyance path H.

The image forming unit 201B serving as an image forming unit for performing printing on the sheet S is configured with a four-drum full-color system. More specifically, the image forming unit 201B includes a laser scanner 210, and four process cartridges 211 for respectively forming toner images of four colors of yellow (Y), magenta (M), cyan (C), and black (K). For example, the process cartridge 211 for black includes a photosensitive drum 212K, a charging unit 213K serving as a charging device, and a development unit 214K serving as a development device. Further, the image forming unit 201B includes a secondary transfer portion 201D and a fixing portion 201E, which are disposed above the process cartridges 211. A toner cartridge 215K is a toner cartridge for supplying toner to the development unit 214K. The configurations for other colors are similar to the configuration for black, and the descriptions of the components related to other colors are omitted.

The secondary transfer portion 201D includes a transfer belt 216 stretched around a drive roller 216*a* and a tension roller 216*b*. In addition, inside the transfer belt 216, a primary transfer roller 219K is provided in contact with the transfer belt 216 at a position opposing the photosensitive drum 212K. The transfer belt 216 is rotated in an arrow direction in FIG. 1 by the drive roller 216*a* driven by a drive unit. At a position opposing the drive roller 216*a* of the secondary transfer portion 201D, a secondary transfer roller 217 for transferring a color image formed on the transfer belt 216 onto the sheet S is provided. Further, above the secondary transfer roller 217, the fixing portion 201E is arranged, and on an upper left side of the fixing portion 201E, a first discharge roller pair 225*a*, a second discharge roller pair 225*b*, and a two-sided reversing portion 201F are disposed. The two-sided reversing portion 201F includes a reversing roller pair 222, which can rotate forward and backward, and a sheet re-conveyance path R through which the sheet S with an image formed on one side thereof is re-conveyed to the image forming unit 201B.

The image reading apparatus 202 is an image reading apparatus approximately horizontally mounted on an upper portion of the image forming apparatus body 201A. A discharge space V for discharging sheets is formed between the image reading apparatus 202 and the image forming apparatus body 201A.

The display unit 250 is a display unit that is provided on an upper portion of the image forming apparatus 200, and can accept operation inputs from a user.

<Operation of Image Forming Apparatus>

An operation of the image forming apparatus 200 will be described.

First, upon receiving image information about a document to be printed by the image forming apparatus 200, the image forming apparatus 200 converts the image information into an electrical signal after image-processing the image information, and transmits the converted image information to the laser scanner 210 of the image forming unit 201B. In the image forming unit 201B, the surface of each of the photosensitive drums uniformly charged at a predetermined polarity and electric potential by the corresponding charging unit is sequentially exposed to a laser beam. With this exposure, electrostatic latent images of yellow, magenta, cyan, and black are sequentially formed on the photosensitive drums of the process cartridges 211, respectively.

Then, the image forming apparatus 200 develops the electrostatic latent images on the photosensitive drums with the toners of the respective colors to visualize them, and the toner images of the respective colors are transferred onto the transfer belt 216 in an overlapped manner by a primary transfer bias applied to the primary transfer roller 219K and the transfer rollers for Y, M, and C. In this way, a full-color toner image is formed on the transfer belt 216. Further, along with the toner image forming operation, the sheet S is conveyed by any one of the cassette sheet feed units 230 to a registration roller pair 240 one by one, and skew feed of the sheet S is corrected by the registration roller pair 240. After the skew feed is corrected, the sheet S is conveyed to the secondary transfer portion 201D by the registration roller pair 240, and at the secondary transfer portion 201D, the toner image is collectively transferred onto the sheet S by a secondary transfer bias applied to the secondary transfer roller 217. The sheet S with the toner image transferred thereon is then conveyed to the fixing portion 201E, and heated and pressurized so that the toners of respective colors are melted and mixed at a roller nip portion formed by a pressure roller 220*a* and a heat roller 220*b*, and the toner image is fixed on the sheet S as a color image. Then, the sheet S with the image fixed thereon is discharged to the discharge space V by the first discharge roller pair 225*a* and the second discharge roller pair 225*b* provided downstream of the fixing portion 201E, and stacked on a stack portion 223 formed on the bottom surface of the discharge space V in a projecting manner. In addition, in a case where images are formed on both sides of the sheet S, after the image is fixed, the sheet S is conveyed by the reversing roller pair 222 to the sheet re-conveyance path R, and conveyed again to the image forming unit 201B.

Figure 2:
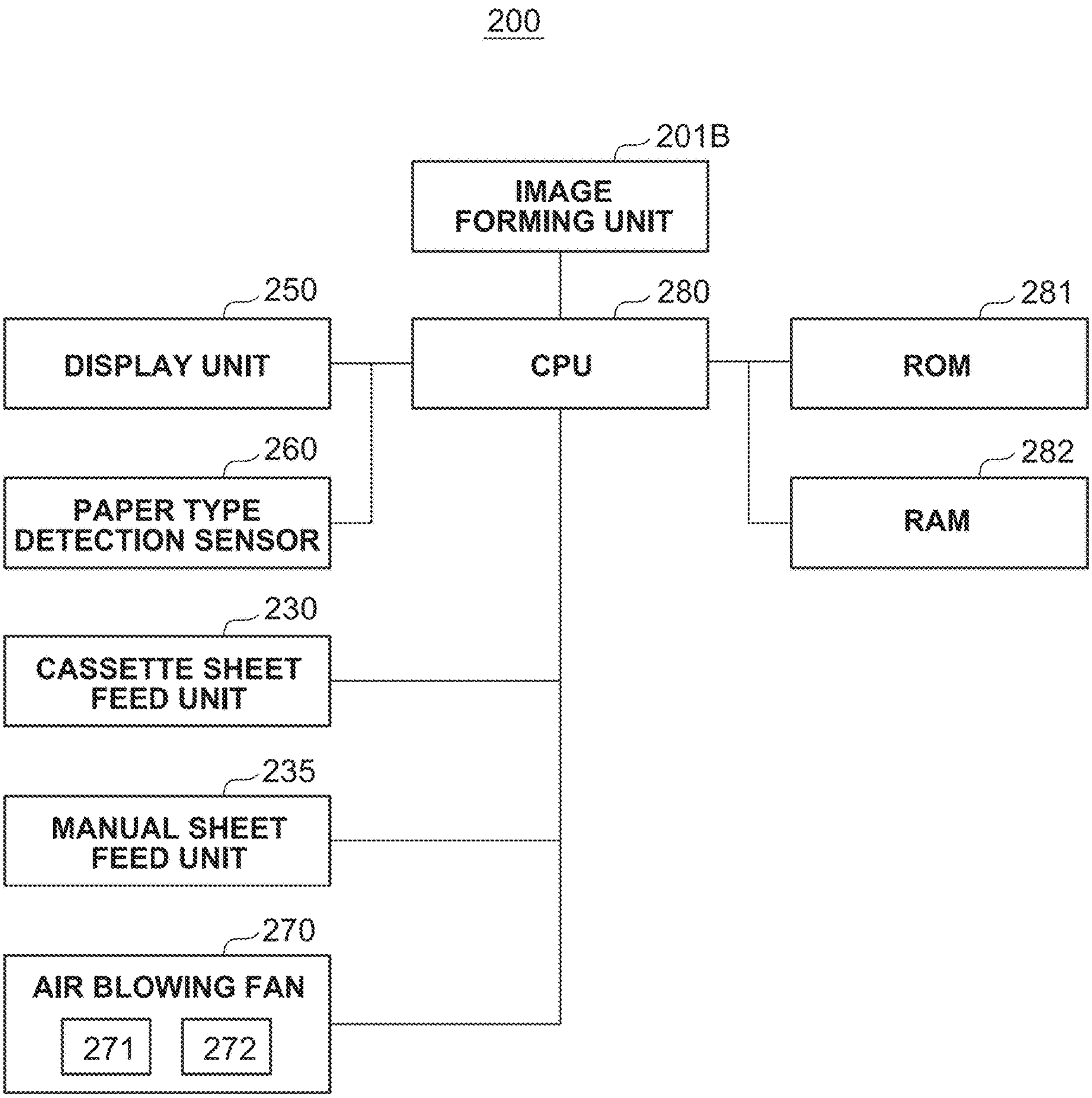
FIG. 2 is a block diagram illustrating an example of a configuration of a control system of the image forming apparatus according to the exemplary embodiment of the present disclosure.

FIG. 2 is a block diagram illustrating an example of a configuration of a control system of the image forming apparatus 200 according to the exemplary embodiment of the present disclosure. In FIG. 2, components similar to those illustrated in FIG. 1 are assigned the same symbols, and the detailed descriptions thereof are omitted.

As illustrated in FIG. 2, as a control system, the image forming apparatus 200 includes the image forming unit 201B, the cassette sheet feed unit(s) 230, the manual sheet feed unit 235, the display unit 250, the paper type detection sensor 260, an air blowing fan 270, a central processing unit (CPU) 280, a read only memory (ROM) 281, and a random access memory (RAM) 282.

The CPU 280 controls the entire image forming apparatus 200. The ROM 281 stores control programs, and initial values and the like of various types of setting values according to the present exemplary embodiment. The CPU 280 implements a procedure of image forming processing and processing procedures of flowcharts described below, by executing control programs according to the present exemplary embodiment read from the ROM 281. The RAM 282 stores various kinds of information under the control of the CPU 280. For example, the RAM 282 stores print control parameters for each type of the sheets S in a first storage area. In addition, the RAM 282 is desirably a rewritable memory of which the memory holding operation is not required. Further, in a case where a user changes a print control parameter corresponding to the type of the referred sheet S, the CPU 280 additionally stores the changed parameter in the above-described first storage area as a user-defined print parameter corresponding to the type of the sheet S.

The display unit 250 includes buttons and an operation panel that can display an operation screen, and transmits instruction information to the CPU 280 when a print operation start instruction or the like is input. In addition, the instruction information about the print operation start or the like may be input from an external apparatus such as a personal computer (PC), a tablet terminal device, or a smartphone connected via a network or the like, in addition to the input by the user operating the display unit 250. Upon receiving the instruction information of the print operation start, the CPU 280 drives and controls a sheet feeding and conveyance motor to feed and convey the sheet S, based on the instruction information. Further, the CPU 280 sets the print control parameters on the image forming unit 201B to control the image forming (printing) by the image forming unit 201B.

The image forming unit 201B performs printing on the sheet S, based on the print control parameters set by the CPU 280.

The paper type detection sensor 260 is provided on the sheet conveyance path H, and is a detection sensor for detecting a type of the sheet S (paper type) by measuring a feature amount of the sheet S fed through the sheet conveyance path H. In addition, the paper type means the type of the sheet S. For example, the paper type detection sensor 260 detects a feature amount such as a surface property or a thickness of the conveyed sheet S, and the CPU 280 determines the type of the sheet S (paper type) from the detection result. In addition, in the present exemplary embodiment, the operation of the paper type detection sensor 260 detecting a feature amount such as a surface property or a thickness of the sheet S, and CPU 280 determining the type of the sheet S (paper type) from the detection result is defined as the operation of the paper type detection sensor 260 detecting the type of the sheet S (paper type).

The air blowing fan 270 is an air blowing unit to blow air to the sheets S stacked on the manual sheet feed tray 5 illustrated in FIG. 1. The air blowing fan 270 includes a fan motor 271 and the air blowing nozzle 272.

<Schematic Configuration of Paper Type Detection Sensor and Paper Type Detection Processing>

The schematic configuration of the paper type detection sensor 260 illustrated in FIGS. 1 and 2, and the paper type detection processing by the paper type detection sensor 260 will be described.

Figure 3:
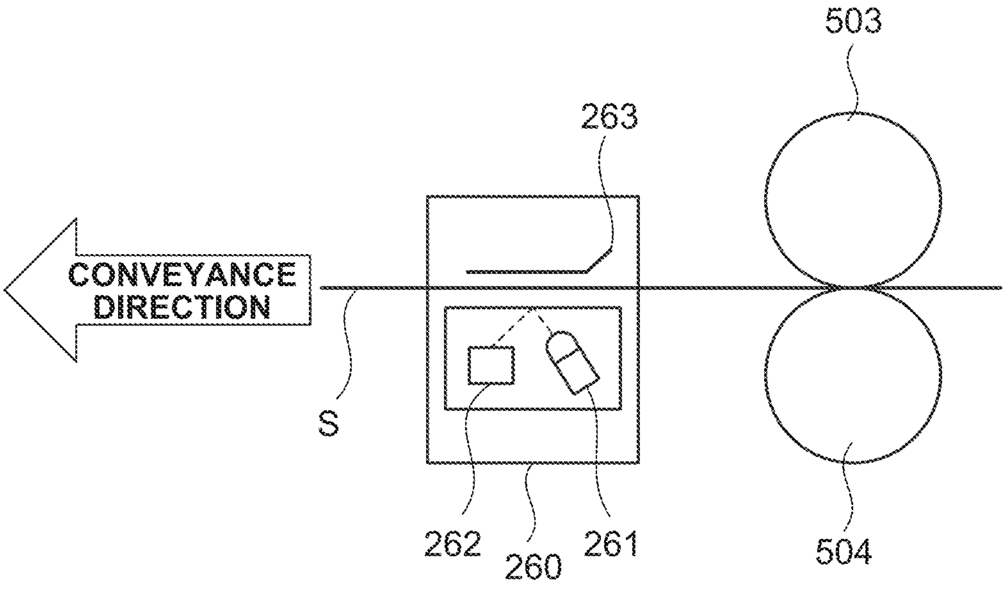
FIG. 3 is a cross-section diagram schematically illustrating an example of a paper type detection sensor illustrated in FIGS. 1 and 2.

FIG. 3 is a cross-section diagram schematically illustrating an example of a configuration of the paper type detection sensor 260 illustrated in FIGS. 1 and 2. In FIG. 3, components similar to those illustrated in FIGS. 1 and 2 are assigned the same symbols, and the detailed descriptions thereof are omitted.

The paper type detection sensor 260 includes a light emitting diode (LED) 261 serving as a light emitting element, a photodiode 262 serving as a light receiving element, and a guide member 263 for guiding the sheet S. More specifically, the paper type detection sensor 260 can detect an amount of reflection light of the light emitted from the LED 261 using the photodiode 262. The CPU 280 receives a detection signal of the photodiode 262 of the paper type detection sensor 260 as an output value of the paper type detection sensor 260. The CPU 280 can determine the type of the passing sheet S based on the difference of the receiving value due to the feature amount such as a surface property or a thickness for each sheet S. Then, the CPU 280 optimally controls the image forming speed or the target temperature of the fixing portion 201E, based on the detected type of the sheet S.

As described above, in the present exemplary embodiment, the CPU 280 determines the type of the sheet using the output value of the paper type detection sensor 260, so that a user does not need to set the type of the sheet S in consideration thereof. For this reason, the image forming apparatus 200 according to the present exemplary embodiment has a mode for detecting the type of the sheet S by the paper type detection sensor 260, and automatically setting the print control parameters based on the detected type of the sheet S (hereinbelow, referred to as "media auto-setting mode"). On the other hand, the image forming apparatus 200 according to the present exemplary embodiment also has a mode for manually setting the type of the sheet S to be used by a user as before (hereinbelow, referred to as "media manual-setting mode"). The user can set any one of the media auto-setting mode or the media manual-setting mode for each of the cassette sheet feed units 230 in advance, by operating the display unit 250. In addition, assume that the default mode is set to the media auto-setting mode. Further, assume that the setting value indicating whether the setting mode is the media auto-setting mode or the media manual-setting mode is stored in the RAM 282 illustrated in FIG. 2. In addition, the schematic configuration of the paper type detection sensor 260 illustrated in FIG. 3 is merely an example, and it is not limited to this configuration in the present disclosure. The paper type detection sensor 260 may have a configuration with, for example, an ultrasonic sensor, such as a piezoelectric element, combined with the light emitting element such as the LED 261, and the light receiving element such as the photodiode 262, or may be sensors with other configurations.

<Schematic Configuration of Manual Sheet Feed Unit and Feeding Processing>

A schematic configuration of the manual sheet feed unit 235 illustrated in FIGS. 1 and 2, and the sheet feeding processing by the manual sheet feed unit 235 will be described.

Figure 4:
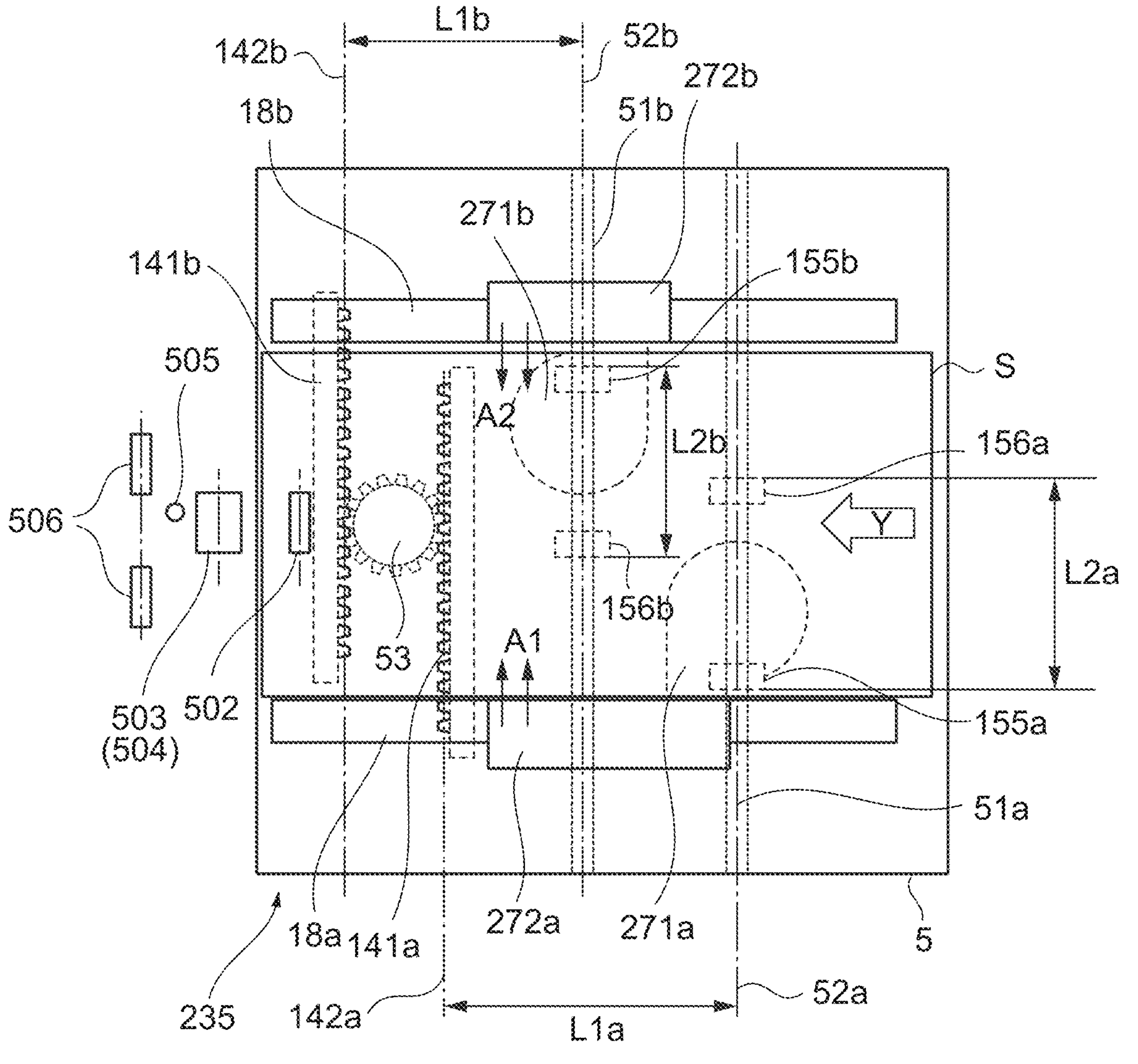
FIG. 4 is a diagram schematically illustrating an example of a manual sheet feeder illustrated in FIGS. 1 and 2.

FIG. 4 is a diagram schematically illustrating an example of a configuration of the manual sheet feed unit 235 illustrated in FIGS. 1 and 2. In FIG. 4, components similar to those illustrated in FIGS. 1 and 2 are assigned the same symbols, and the detailed descriptions thereof are omitted.

The manual sheet feed unit 235 includes the manual sheet feed tray 5, the pickup roller 502, the feed roller 503, the retard roller 504, side end restriction plates 18*a* and 18*b*, side end restriction plate racks 141*a* and 141*b*, and a pinion gear 53. Further, the manual sheet feed unit 235 includes fan motors 271*a* and 271*b*, and air blowing nozzles 272*a* and 272*b*, which configure the air blowing fan 270 serving as an air blowing unit, and support shafts 51*a* and 51*b* for supporting the air blowing fan 270 serving as the air blow unit.

The side end restriction plates 18*a* and 18*b* are members for restricting the position of the sheet S in a direction (sheet width direction) orthogonal to an arrow Y direction indicating the conveyance direction of the sheet S. The fan motors 271*a* and 271*b* are attached to the side end restriction plates 18*a* and 18*b*, respectively. The fan motor 271*a* moves along with the movement of the side end restriction plate 18*a*, and the fan motor 271*b* moves along with the movement of the side end restriction plate 18*b*. With the fan motors 271*a* and 271*b*, air can be blown to the sheet S via the air blowing nozzles 272*a* and 272*b*. The air from the fan motors 271*a* and 271*b* is blown to the ends of the sheet S via the air blowing nozzles 272*a* and 272*b* as illustrated by streamlines A1 and A2, respectively, and the sheets S stacked on an upper portion of the sheet bundle are floated to reduce the adhesive force between the sheets in the sheet bundle.

For example, the sheet feeding starts when a start button is pressed. In a case where the type of the sheet S is a coated paper, the fan motors 271*a* and 271*b* start operating to blow air via the air blowing nozzles 272*a* and 272*b* to the ends in the sheet width direction of the sheet S. Then, after a predetermined time has elapsed, the uppermost sheet S with the adhesive force between the sheets reduced is conveyed to a separation portion composed of the feed roller 503 and the retard roller 504 by the rotation of the pickup roller 502. The leading end of the separated sheet S is detected by the sheet detection sensor 505, and the type (paper type) of the sheet S is detected by the paper type detection sensor 260. Then, the sheet S is conveyed to the registration roller pair 240 by a conveyance roller pair 506 through the sheet conveyance path H.

The operation of the manual sheet feed unit 235 thereafter is similar to that of the above-described cassette sheet feed unit 230. A toner image is transferred on the sheet S at the secondary transfer portion 201D at an appropriate timing. Then, the toner image is fixed on the sheet S at the fixing portion 201E, and the sheet S is discharged to the stack portion 223 by the first discharge roller pair 225*a*. In addition, when images are to be formed on both surfaces of the sheet S, the sheet S is reversed at the two-sided reversing portion 201F, and conveyed again to the registration roller pair 240 through the sheet re-conveyance path R. Then, similar to the case of the first surface, the sheet S with the images formed on its both sides is discharged to the stack portion 223, and a series of image forming operations ends.

In the manual sheet feed unit 235 illustrated in FIG. 4, the side end restriction plate rack 141*a* and the side end restriction plate rack 141*b* are connected via the pinion gear 53 rotatably supported by the manual sheet feed tray 5. In FIG. 4, the distance between a mating pitch line 142*a* between the side end restriction plate rack 141*a* and the pinion gear 53, and a center line 52*a* of the support shaft 51*a* is defined as a rack-support shaft distance L1*a*. Further, in FIG. 4, the distance between a shaft holding member 155*a* and a shaft holding member 156*a* of the support shaft 51*a* is defined as a shaft holding distance L2*a*. Similarly, in FIG. 4, the distance between a mating pitch line 142*b* between the side end restriction plate rack 141*b* and the pinion gear 53, and a center line 52*b* of the support shaft 51*b* is defined as a rack-support shaft distance L1*b*. Further, in FIG. 4, the distance between a shaft holding member 155*b* and a shaft holding member 156*b* of the support shaft 51*b* is defined as a shaft holding distance L2*b*.

<Air Separation Setting Before Paper Type Detection>

Figure 5:
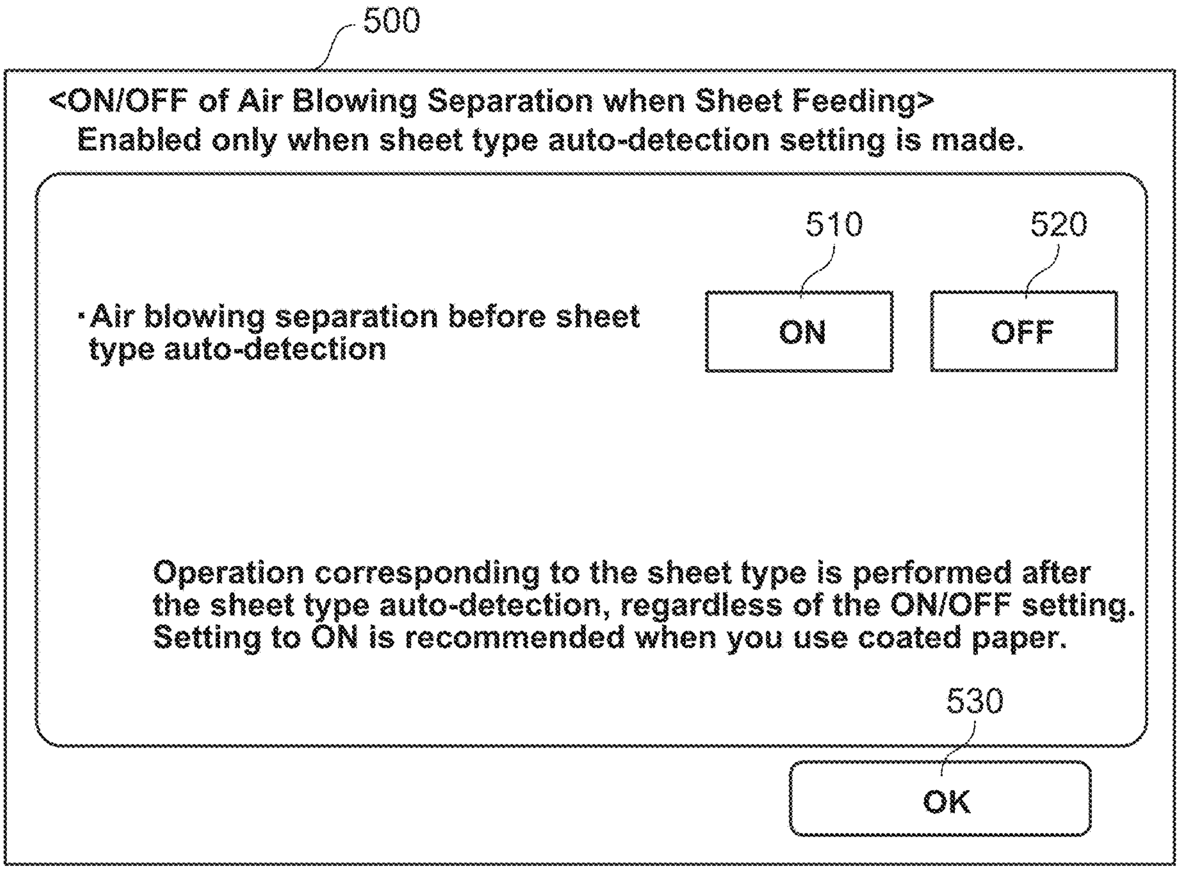
FIG. 5 is a diagram illustrating an example of a setting screen for setting whether to execute an air blowing separation by an air blowing fan on a sheet bundle placed on a manual sheet feed tray before detecting a type of sheet by a paper type detection sensor, according to the exemplary embodiment of the present disclosure.

FIG. 5 is a diagram illustrating an example of a setting screen 500 for setting whether to execute an air blowing separation by the air blowing fan 270 on a sheet bundle placed on the manual sheet feed tray 5 before detecting the type of the sheet S by the paper type detection sensor 260, according to the exemplary embodiment of the present disclosure. The setting screen 500 illustrated in FIG. 5 is displayed on the display unit 250 controlled by the CPU 280. Further, on the setting screen 500 illustrated in FIG. 5, an "ON" button 510, an "OFF" button 520, and an "OK" button 530 are provided. The "ON" button 510 is a button to be pressed in a case where a setting to execute an air blowing separation before detecting the type of the sheet S by the paper type detection sensor 260 is performed. Further, the "OFF" button 520 is a button to be pressed in a case where a setting not to execute an air blowing separation before detecting the type of the sheet S by the paper type detection sensor 260 is performed. Further, the "OK" button 530 is a button to be pressed in a case where the currently set setting about whether to execute the air blowing separation before detecting the type of the sheet S by the paper type detection sensor 260 is confirmed.

When the "OK" button 530 is pressed after the "ON" button 510 or the "OFF" button 520 provided on the setting screen 500 is pressed, the CPU 280 stores in the ROM 281 or the RAM 282 the setting information indicating whether to execute an air blowing separation by the air blowing fan 270. The CPU 280 that performs storage processing of the setting information in the ROM 281 or the RAM 282 constitutes a processor.

The CPU 280 reads out the above-described setting information from the ROM 281 or the RAM 282, when the sheet S is fed before detecting the type of the sheet S by the paper type detection sensor 260. Then, the CPU 280 controls whether to execute the air blowing separation by the air blowing fan 270 (i.e., whether to blow air from the air blowing fan 270) before the paper type detection sensor 260 detects the type of the sheet S, based on the setting of the setting information. The CPU 280 that controls whether to execute the air blowing separation by the air blowing fan 270 (i.e., whether to blow air from the air blowing fan 270) constitutes a control unit. More specifically, in a case where ON is set by pressing the "ON" button 510 as the setting information, the CPU 280 performs control to execute the air blowing separation by the air blowing fan 270 (i.e., blow air from the air blowing fan 270), before detecting the type of the sheet S by the paper type detection sensor 260. Further, in a case where OFF is set by pressing the "OFF" button 520 as the setting information, the CPU 280 performs control not to execute the air blowing separation by the air blowing fan 270 (i.e., not to blow air from the air blowing fan 270), before detecting the type of the sheet S by the paper type detection sensor 260.

In addition, the setting screen 500 illustrated in FIG. 5 may be displayed on the display unit 250 as one of management setting items of the image forming apparatus 200, or may be displayed on the display unit 250 as one of job setting items of the print job.

<Setting of Sheet Placed on Manual Sheet Feed Tray>

Figure 6A:
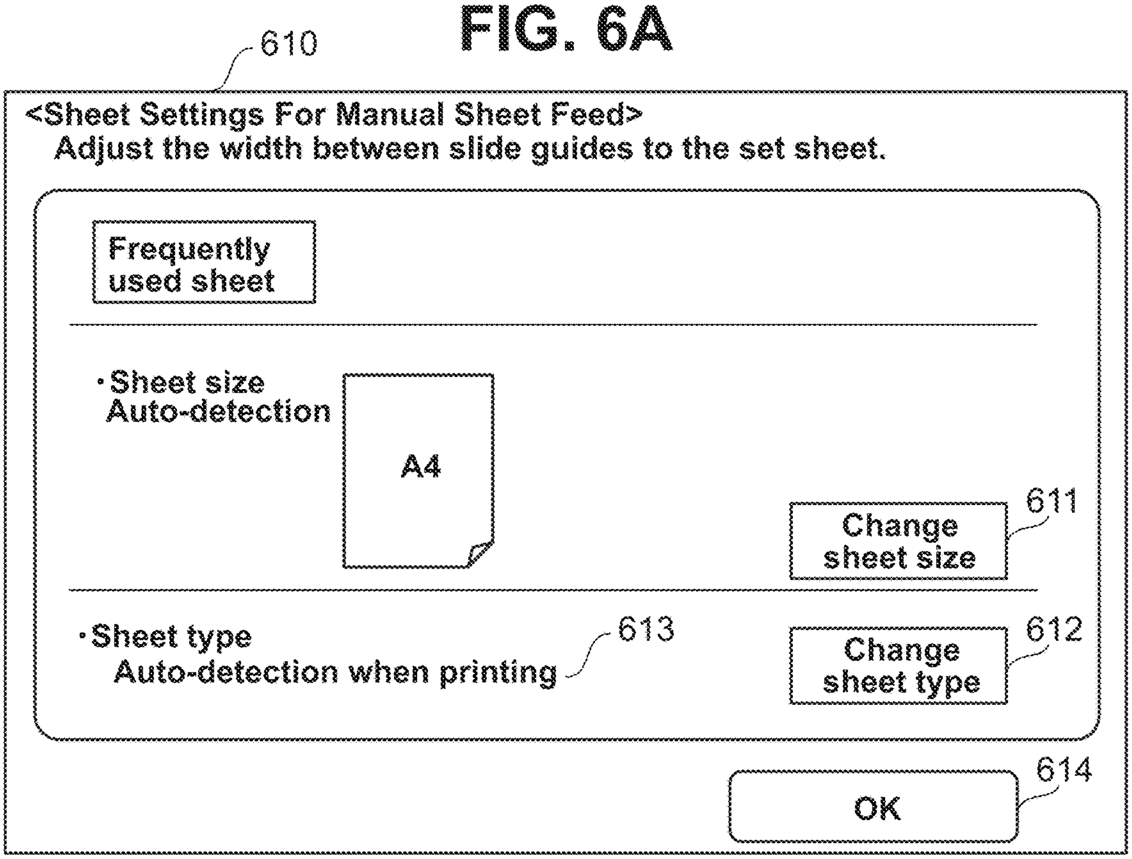
FIGS. 6A and 6B are diagrams illustrating examples of setting screens for a sheet placed on the manual sheet feed tray, according to the exemplary embodiment of the present disclosure.
Figure 6B:
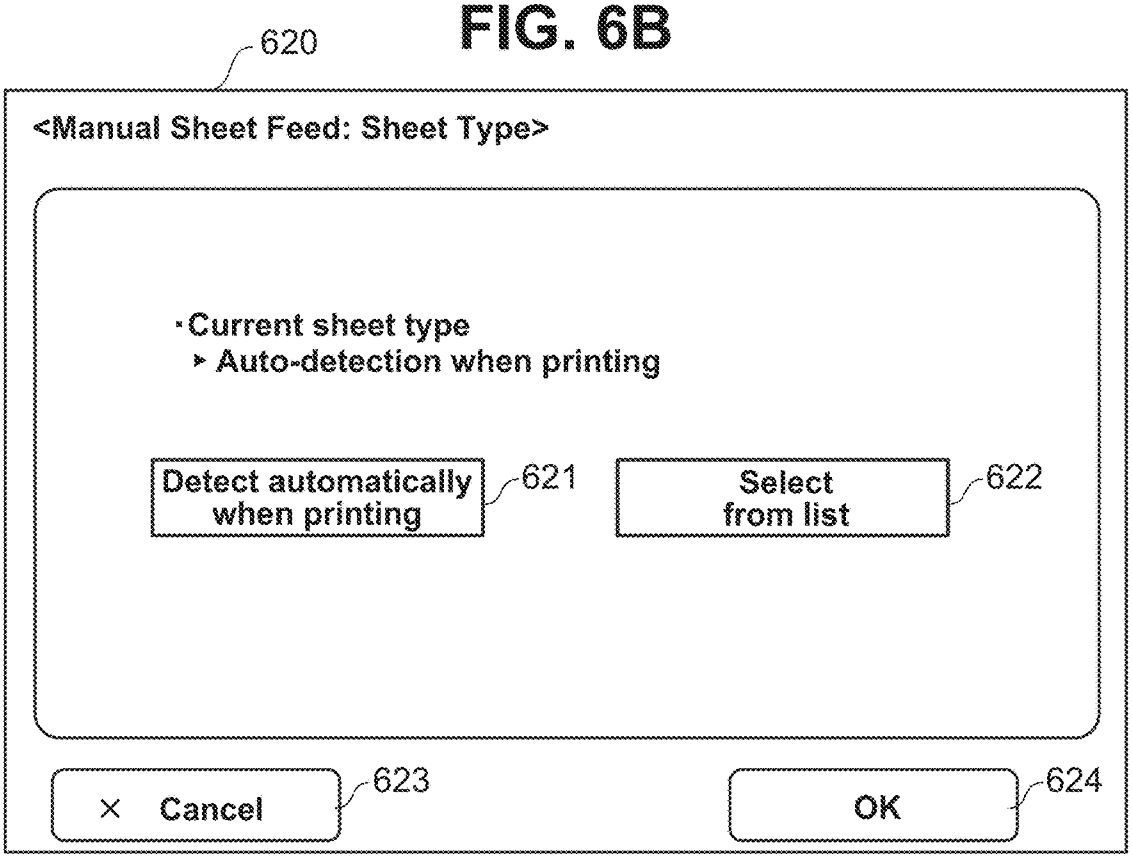

FIGS. 6A and 6B are diagrams illustrating examples of setting screens 610 and 620 for the sheet S placed on the manual sheet feed tray 5, according to the exemplary embodiment of the present disclosure. The setting screens 610 and 620 illustrated in FIGS. 6A and 6B are displayed on the display unit 250 by the control of the CPU 280.

More specifically, FIG. 6A illustrates the setting screen 610 displayed on the display unit 250 when the sheet S is placed on the manual sheet feed tray 5. On the setting screen 610 illustrated in FIG. 6A, a "Change sheet size" button 611, a "Change sheet type" button 612, a currently set sheet type display area 613, and an "OK" button 614 are provided. On the setting screen 610 illustrated in FIG. 6A, the setting change of the sheet size and the setting change of the sheet type can be performed, and by pressing the "Change sheet type" button 612, the type of the sheet can be designated.

On the setting screen 610 illustrated in FIG. 6A, when the "Change sheet type" button 612 is pressed, the screen transitions to the setting screen 620 illustrated in FIG. 6B. On the setting screen 620 illustrated in FIG. 6B, a "Detect automatically when printing" button 621, a "Select from list" button 622, a "Cancel" button 623, and an "OK" button 624 are provided. The "Detect automatically when printing" button 621 is a setting button for executing an operation to detect by the paper type detection sensor 260 the type of the sheet S fed from the manual sheet feed tray 5. In a case where the "Select from list" button 622 is pressed, the CPU 280 displays a sheet type list screen on the display unit 250, to allow a user to select any sheet type. At this time, on the sheet type list screen displayed on the display unit 250, the sheet types (paper types) existing in a paper type database stored in the ROM 281 in advance is displayed in a list format. On the setting screen 620 illustrated in FIG. 6B, when the "OK" button 624 is pressed after the "Detect automatically when printing" button 621 is pressed, or the type of the sheet S is selected from the sheet type list screen, the screen returns to the setting screen 610 illustrated in FIG. 6A.

Then, on the setting screen 610 illustrated in FIG. 6A, when the "OK" button 614 is pressed, the CPU 280 stores the setting information about the sheet S placed on the manual sheet feed tray 5 into the ROM 281 or the RAM 282.

<Procedure of Image Forming Processing for Print Job>

Figure 7:
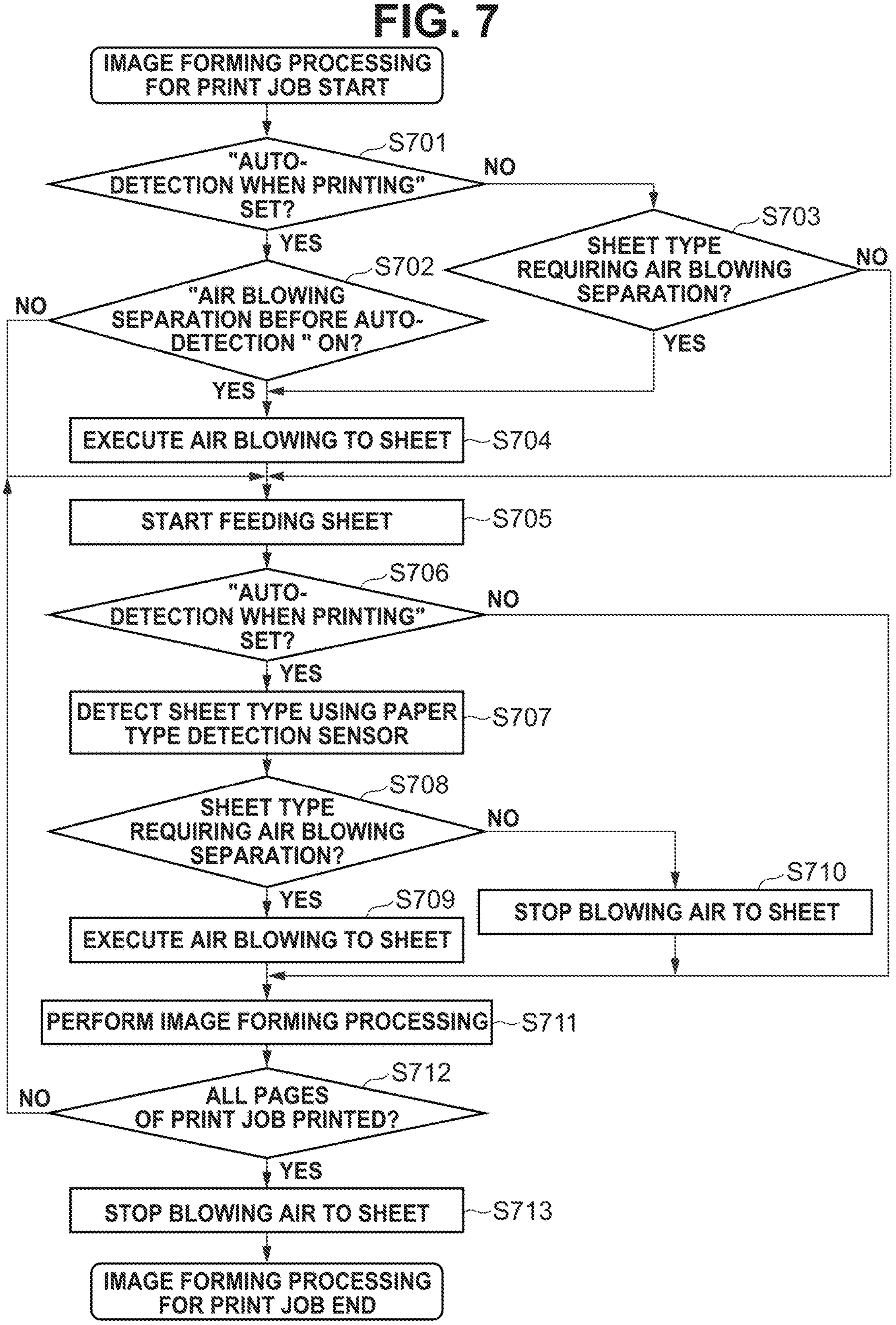
FIG. 7 is a flowchart illustrating an example of a processing procedure of a control method of an image forming apparatus according to the exemplary embodiment of the present disclosure.

FIG. 7 is a flowchart illustrating an example of a processing procedure of a control method of the image forming apparatus 200 according to the exemplary embodiment of the present disclosure. More specifically, FIG. 7 is a flowchart illustrating an example of a processing procedure in the image forming processing of a print job, and includes a control step of whether to blow air from the air blowing fan 270 according to the present exemplary embodiment. Each step illustrating in FIG. 7 is implemented by the CPU 280 executing a control program read from the ROM 281 and loaded into the RAM 282.

Further, the flowchart illustrated in FIG. 7 starts when a sheet S is placed on the manual sheet feed tray 5, and a print job is input after the sheet settings described with reference to FIGS. 6A and 6B are completed. As the print job at this time, for example, a copy job is executed for which a user operates the display unit 250 to select one of the cassette sheet feed units 230 set by pressing the "Detect automatically when printing" button 621 illustrated in FIG. 6B. Alternatively, as the print job at this time, a page-description language (PDL) print job may be executed, in which one of the cassette sheet feed units 230 with the "auto-detection when printing" set by a printer driver on an information processing terminal device, such as a PC connected via a network, is selected. Further, consider a case of a print job in which a sheet feed portion with the "auto-detection when printing" set in the print job setting is set, and a setting with a sheet type in the print job not explicitly designated, such as an "auto" or an "auto-selection" is made. In this case, assume that the paper type detection sensor (media sensor) 260 measures the feature amount of the sheet S to detect the type of the sheet S.

Upon starting the processing of the flowchart illustrated in FIG. 7, in step S701, the CPU 280 reads out from the ROM 281 or the RAM 282 the setting information about the sheet S placed on the manual sheet feed tray 5 described with reference to FIGS. 6A and 6B. Then, the CPU 280 determines whether the sheet type is set to the "auto-detection when printing", based on the read-out setting information.

As a result of the determination in step S701, in a case where the sheet type is set to the "auto-detection when printing" (YES in step S701), the processing proceeds to step S702. In step S702, the CPU 280 reads out from the ROM 281 or the RAM 282 the setting information (ON/OFF) indicating whether to execute the air blowing separation by the air blowing fan 270 before detecting the type of the sheet S by the paper type detection sensor 260 described with reference to FIG. 5. Then, the CPU 280 determines based on the read-out setting information whether the setting is to execute (ON) the air blowing separation by the air blowing fan 270 before detecting the type of the sheet S by the paper type detection sensor 260.

Further, as a result of the determination in step S701, in a case where the sheet type is not set to the "auto-detection when printing" (NO in step S701), i.e., the sheet type on the media library is set, the processing proceeds to step S703. In step S703, the CPU 280 determines whether the sheet type (paper type) set on the media library is a sheet type that requires the air blowing separation. In this case, the information indicating whether the sheet type requires the air blowing separation is stored in the media library for each paper type as a print control parameter.

In this case, examples of the sheet types that require the air blowing separation (first type) include a coated paper with a high possibility of double feeding. Further, examples of the sheet types that do not require the air blowing separation (second type) include a plain paper.

In step S702, in a case where the CPU 280 determines that the setting is to execute (ON) the air blowing separation by the air blowing fan 270 before detecting the type of the sheet S by the paper type detection sensor 260 (YES in step S702), the processing proceeds to step S704. Similarly, in step S703, in a case where the CPU 280 determines that the sheet type (paper type) set on the media library is the sheet type that requires the air blowing separation (YES in step S703), the processing proceeds to step S704. In step S704, the CPU 280 performs control to execute air blowing to the sheet S placed on the manual sheet feed tray 5 by the air blowing fan 270.

The processing proceeds to step S705, in a case where the processing in step S704 is completed, a negative determination is performed in step S702 (NO in step S702), or a negative determination is performed in step S703 (NO in step S703). In step S705, the CPU 280 starts feeding the sheet S on the manual sheet feed tray 5.

In step S706, the CPU 280 reads out from the ROM 281 or the RAM 282 the setting information about the sheet S placed on the manual sheet feed tray 5 described with reference to FIGS. 6A and 6B. Then, the CPU 280 determines whether the sheet type is set to the "auto-detection when printing", based on the read-out setting information.

As a result of the determination in step S706, in a case where the sheet type is set to the "auto-detection when printing" (YES in step S706), the processing proceeds to step S707. In step S707, the CPU 280 causes the paper type detection sensor 260 to measure the feature amount of the sheet S to detect the type of the sheet S.

In step S708, the CPU 280 determines whether the type of the sheet S detected in step S707 is the sheet type that requires the air blowing separation. In this case, examples of the sheet types that require the air blowing separation (first type) include a coated paper with a high possibility of double feeding. Further, examples of the sheet types that do not require the air blowing separation (second type) include a plain paper.

As a result of the determination in step S708, in a case where the type of the sheet S detected in step S707 is the sheet type that requires the air blowing separation (YES in step S708), the processing proceeds to step S709. In step S709, the CPU 280 performs control to execute air blowing to the sheet S placed on the manual sheet feed tray 5 by the air blowing fan 270.

On the other hand, as a result of the determination in step S708, in a case where the type of the sheet S detected in step S707 is not the sheet type that requires the air blowing separation (NO in step S708), the processing proceeds to step S710. In step S710, the CPU 280 performs control to stop the air blowing to the sheet S placed on the manual sheet feed tray 5 by the air blowing fan 270.

The processing proceeds to step S711, in a case where the processing in step S709 is completed, the processing in step S710 is completed, or the sheet type is determined not to be the setting of "auto-detection when printing" in step S706 (NO in step S706). In step S711, the CPU 280 restarts the sheet feed operation of the sheet S, and performs control to execute the image forming processing on the sheet S.

In step S712, the CPU 280 determines whether all pages of the print job have been printed. As a result of the determination in step S712, in a case where not all the pages of the print job have been printed (NO in step S712), the processing returns to step S705, and the processing in step S705 and the subsequent steps is performed on the pages of the print job not printed yet.

On the other hand, as a result of the determination in step S712, in a case where all the pages of the print job have been printed (YES in step S712), the processing proceeds to step S713. In step S713, the CPU 280 performs control to stop the air blowing to the sheet S placed on the manual sheet feed tray 5 by the air blowing fan 270.

When the processing in step S713 is completed, the processing of the flowchart illustrated in FIG. 7 ends.

In the present exemplary embodiment, the air blowing operation by the air blowing fan 270 may be performed during the image forming processing, or may be performed during a predetermined time period, or for each predetermined number of printing sheets.

In the processing using the flowchart illustrated in FIG. 7, the CPU 280 can control the air blowing separation not to be executed, in a case of an environment in which the sheet S such as a coated paper that requires the air blowing separation is not used, by setting whether to execute the air blowing separation before the paper type detection in advance. In this case, it is possible to reduce the air blowing time for the air blowing separation, and thus it is possible to reduce a deterioration in printing efficiency of the sheet S.

<Warning Display Processing when Coated Paper is Detected without Executing Air Blowing Separation>

With the processing using the flowchart illustrated in FIG. 7, it is possible to start the feeding of the sheet S without executing the air blowing separation on the sheet S before the paper type detection. However, in a case where the sheet S fed without executing the air blowing separation is the sheet of which the paper type detected by the paper type detection sensor 260 is the sheet that requires the air blowing separation, such as a coated paper, there can be a possibility that a plurality of sheets has been fed in a double feed manner. Then, in a case where the sheets S are actually double-fed, there arises an issue that a false detection of a sheet grammage or a double-feed paper jam may occur. A control method for solving the issue will be described with reference to FIG. 8.

Figure 8:
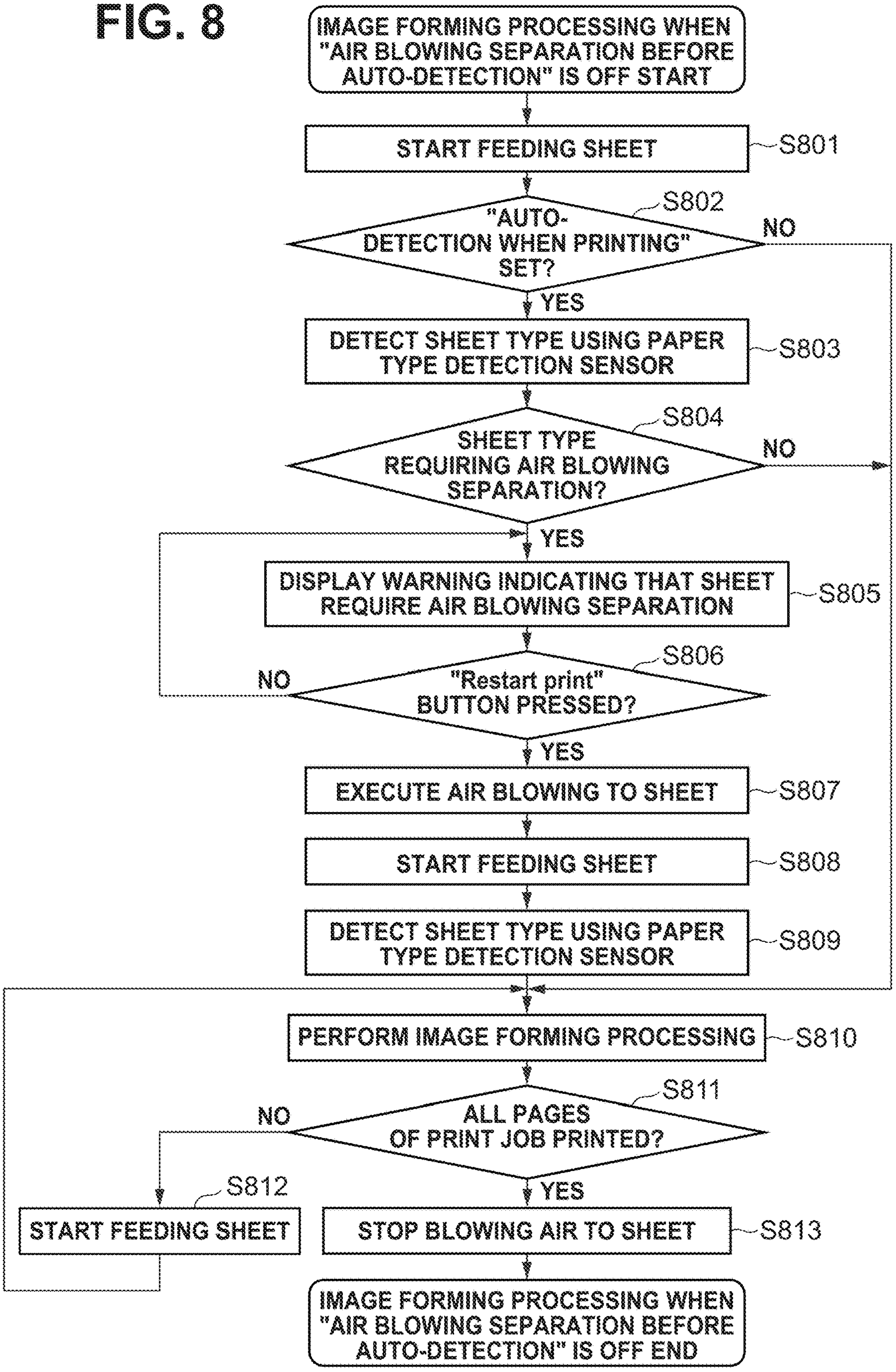
FIG. 8 is a flowchart illustrating an example of a processing procedure of a control method of the image forming apparatus according to the exemplary embodiment of the present disclosure.

FIG. 8 is a flowchart illustrating an example of a processing procedure of a control method of the image forming apparatus 200 according to the exemplary embodiment of the present disclosure. More specifically, FIG. 8 is a flowchart illustrating an example of a processing procedure of image forming processing of a print job in a case where the air blowing separation before the auto-detection of the sheet type is not performed (OFF). Each step illustrating in FIG. 8 is implemented by the CPU 280 executing a control program read-out from the ROM 281 and loaded in the RAM 282.

Further, the flowchart illustrated in FIG. 8 starts when a sheet S is placed on the manual sheet feed tray 5, and a print job is input after the sheet settings described with reference to FIGS. 6A and 6B are completed, in a state where the "air blowing separation before the auto-detection of the sheet type" illustrated in FIG. 5 is set to OFF.

Upon starting the flowchart illustrated in FIG. 8, in step S801, the CPU 280 starts feeding the sheet S placed on the manual sheet feed tray 5 without executing the air blowing separation.

In step S802, the CPU 280 read out from the ROM 281 or the RAM 282 the setting information about the sheet S placed on the manual sheet feed tray 5 described with reference to FIGS. 6A and 6B. Then, the CPU 280 determines whether the sheet type is set to the "auto-detection when printing", based on the read-out setting information.

As a result of the determination in step S802, in a case where the sheet type is set to the "auto-detection when printing" (YES in step S802), the processing proceeds to step S803. In step S803, the CPU 280 causes the paper type detection sensor 260 to measure the feature amount of the sheet S to detect the type of the sheet S.

In step S804, the CPU 280 determines whether the type of the sheet S detected in step S803 is the sheet type that requires the air blowing separation. In this case, examples of the sheet types that require the air blowing separation (first type) include a coated paper with a high possibility of double feeding. Further, examples of the sheet types that do not require the air blowing separation (second type) include a plain paper.

As a result of the determination in step S804, in a case where the type of the sheet S detected in step S803 is the sheet type that requires the air blowing separation (YES in step S804), the processing proceeds to step S805. In step S805, the CPU 280 stops conveying the sheet S of which the sheet type is detected by the paper type detection sensor 260, and then displays a warning on the display unit 250 for prompting a user to execute the air blowing separation and restart the feeding of the sheet S, because the sheet S that requires the air blowing separation is detected.

Figure 9:
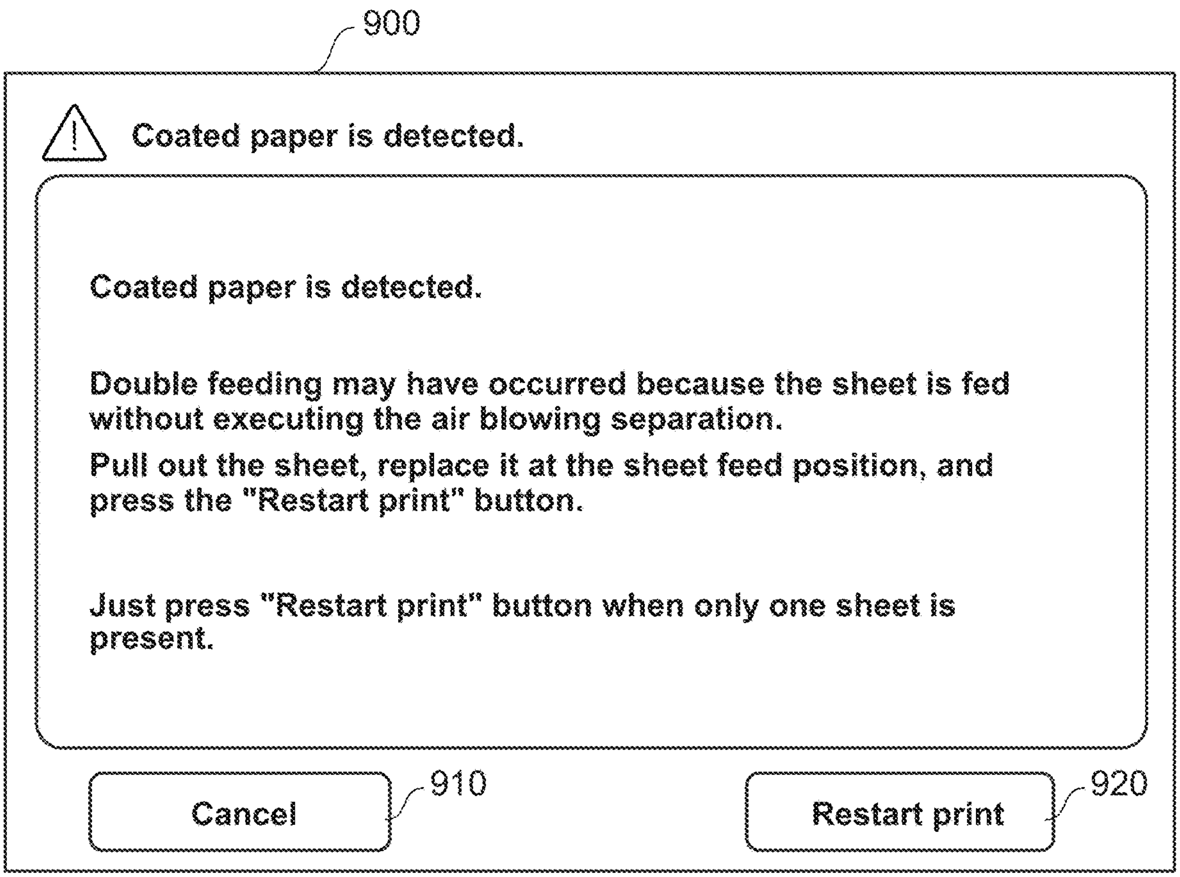
FIG. 9 is a diagram illustrating an example of a warning display screen displayed on a display in step S805 in FIG. 8, according to the exemplary embodiment of the present disclosure.

FIG. 9 is a diagram illustrating an example of a warning display screen 900 displayed on the display unit 250 in step S805 in FIG. 8, according to the exemplary embodiment of the present disclosure. On the warning display screen 900, a "Cancel" button 910 and a "Restart print" button 920 are provided, in addition to a warning display area. On the warning display screen 900 illustrated in FIG. 9, since the paper type detection sensor 260 detects a coated paper, and a warning message of "Double feeding may have occurred because the sheet(s) is (are) fed without executing the air blowing separation." is displayed. In addition, on the warning display screen 900 illustrated in FIG. 9, a message for prompting a user to "Pull out the sheet, replace it at the sheet feed position (i.e., on the manual sheet feed tray 5), and press the "Restart print" button" is displayed.

Now, the description returns to FIG. 8.

After the processing in step S805 is completed, the processing proceeds to step S806. In step S806, the CPU 280 determines whether the "Restart print" button 920 on the warning display screen 900 illustrated in FIG. 9 is pressed. As a result of the determination in step S806, in a case where the "Restart print" button 920 is not pressed (NO in step S806), the processing returns to step S805.

On the other hand, as a result of the determination in step S806, in a case where the "Restart print" button 920 is pressed (YES in step S806), the processing proceeds to step S807. In step S807, the CPU 280 performs control to execute air blowing to the sheet S placed on the manual sheet feed tray 5 by the air blowing fan 270.

In step S808, the CPU 280 starts feeding the sheet S placed on the manual sheet feed tray 5.

In step S809, the CPU 280 causes the paper type detection sensor 260 to measure the feature amount of the sheet S to detect the type of the sheet S. At this time, the detection of the type of the sheet S is executed in consideration of the possibility of the false detection of the grammage by measuring the feature amount of the sheet(s) S possible to be double fed in step S803.

After the proceeding in step S809 is completed, the processing proceeds to step S810. Further, in step S802, in a case where the CPU 280 determines that the sheet type is not set to the "auto-detection when printing" (NO in step S802), i.e., the sheet type on the media library is set, the processing proceeds to step S810. Further, in step S804, also in a case where the CPU 280 determines that the type of the sheet S detected in step S803 is not the sheet type that requires the air blowing separation (NO in step S804), the processing proceeds to step S810.

In step S810, the CPU 280 performs control to execute the image forming processing on the sheet S.

In step S811, the CPU 280 determines whether all pages of the print job have been printed.

As a result of the determination in step S811, in a case where not all the pages of the print job have been printed (NO in step S811), the processing proceeds to step S812. In step S812, in order to print the sheet S of the printing pages of the print job of which the printing is not completed yet, the CPU 280 starts feeding the sheet S. Then, the processing returns to step S810, and the processing in step S810 and the subsequent steps is performed.

On the other hand, as a result of the determination in step S811, in a case where all the pages of the print job have been printed (YES in step S811), the processing proceeds to step S813. In step S813, the CPU 280 performs control to stop blowing the air to the sheet S placed on the manual sheet feed tray 5 by the air blowing fan 270.

When the processing in step S813 is completed, the processing of the flowchart illustrated in FIG. 8 ends.

In the processing using the flowchart illustrated in FIG. 8, the CPU 280 performs the paper type detection without executing the air blowing separation of the sheet S, and in a case where the detected paper type is the paper type that requires the air blowing separation, such as a coated paper, the CPU 280 displays the warning display screen 900 illustrated in FIG. 9 on the display unit 250. By displaying the warning display screen 900 illustrated in FIG. 9 on the display unit 250, the CPU 280 can perform the air blowing separation on the sheet S and refeed the sheet S, to prevent the false detection of the paper type and the double feed jam.

In the image forming apparatus 200 according to the above-described present exemplary embodiment, the CPU 280 sets whether to blow air from the air blowing fan 270 serving as an air blowing unit to the sheet S placed on the manual sheet feed tray 5, using the setting screen 500 illustrated in FIG. 5. In addition, the CPU 280 performs control of whether to blow air from the air blowing fan 270 (i.e., whether to execute the air blowing separation) before the paper type detection sensor 260, which may operate as a detector or detection unit, detects the type of the sheet S, based on the above-described setting.

With this configuration, it is possible to reduce the air blowing time for the air blowing separation, because the control not to execute the air blowing separation is possible in the environment in which the sheet S, such as a coated paper, that requires the air blowing separation is not used. In this way, it is possible to reduce a deterioration in print efficiency of the sheet S.

Further, in the image forming apparatus 200 according to the present exemplary embodiment, the CPU 280 performs the following processing after the paper type detection sensor 260 detects the type of the sheet S. Specifically, the CPU 280 performs control of whether to blow air from the air blowing fan 270 to the sheets S stacked on the manual sheet feed tray 5, based on the result of the detection by the paper type detection sensor 260 as illustrated in steps S707 to S710 in FIG. 7.

Further, in the image forming apparatus 200 according to the present exemplary embodiment, the CPU 280 performs the following processing, in the case where the setting not to execute the air blowing separation before the detection of the type of the sheet S by the paper type detection sensor 260 is performed by the setting made using the setting screen 500 illustrated in FIG. 5. Specifically, the CPU 280 performs control to stop conveying the sheet S of which the type is detected by the paper type detection sensor 260 and to perform the waring display, in the case where the CPU 280 performs control to blow air from the air blowing fan 270 to the sheet S, based on the detection result of the paper type detection sensor 260.

With this configuration, by performing the warning display of the warning display screen 900 illustrated in FIG. 9, it is possible to execute the air blowing separation on the sheet S and refeed the sheet S, and thus to prevent the false detection of the paper type, and the double feed jam.

In addition, the exemplary embodiments described above are merely examples of the embodiments to realize the present disclosure, and shall not be construed as limiting the technical range of the present disclosure. Thus, the present disclosure can be realized in diverse ways as long as it is in accordance with the technological thought or main features of the present disclosure.

The present exemplary embodiments include configurations, a method, and a storage medium as described herein.

An image forming apparatus is provided that includes an imager configured to print at least one image on one or more sheets, a sheet feeder configured to feed the one or more sheets to the imager via a sheet conveyance path from a sheet feed tray configured to stack the one or more sheets, a blower configured to blow air onto the one or more sheets stacked on the sheet feed tray, a sensor provided along the sheet conveyance path and configured to detect a sheet type of the one or more sheets; and a processor configured to set whether to blow the air from the blower before the sensor detects the sheet type. The blower blows the air when the sheet feeder feeds a sheet of the one or more sheets before the sensor detects the sheet type, in a case where a setting to blow the air is made by the processor. The blower does not blow the air when the sheet feeder feeds the sheet before the sensor detects the sheet type, in a case where a setting not to blow the air is made by the processor.

In a second configuration, even in the case where the setting not to blow the air is made by the processor, the blower blows the air to the sheet stacked on the sheet feed tray, in a case where the detected sheet type is a first type.

In a third configuration, even in the case where the setting to blow the air is made by the processor, the blower does not blow the air to the sheet stacked on the sheet feed tray, in a case where the detected sheet type is a second type.

Regarding the image forming apparatus according to the second configuration, the first sheet type may be a coated paper.

Regarding the image forming apparatus according to the third configuration, the second sheet type may be a plain paper.

Regarding the image forming apparatus according to the second configuration, a display may be configured to output a warning in a case where the setting not to blow the air is made by the processor, and the type of the sheet detected by the sensor is the first type.

Regarding the first configuration of the image forming apparatus, the sensor may detect the sheet type using a detected feature of a sheet of the one or more sheets.

Also provided is a control method for an image forming apparatus including an imager configured to print at least one image on one or more sheets, a sheet feeder configured to feed the one or more sheets to the imager via a sheet conveyance path from a sheet feed tray configured to stack the one or more sheets, a blower configured to blow air onto the one or more sheets stacked on the sheet feed tray, a sensor provided along the sheet conveyance path and configured to detect a sheet type of the one or more sheets, and a processor. The control method includes setting, by the processor, whether to blow the air from the blower before the sensor detects the sheet type, blowing, by the blower, the air when the sheet feeder feeds a sheet of the one or more sheets before the sensor detects the sheet type, in a case where a setting to blow the air is made by the processor, and not blowing, by the blower, the air when the sheet feeder feeds the sheet before the sensor detects the sheet type, in a case where a setting not to blow the air is made by the processor.

Also provided is a non-transitory computer readable storage medium storing a program for causing a computer to execute the above-described control method for the image forming apparatus.

Thus, according to the present disclosure, it is possible to reduce the deterioration in printing efficiency of the sheet.

Embodiment(s) of the present disclosure may also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to only the disclosed exemplary embodiments. The scope of the following claims is to be accorded the broadest interpretation so as to encompass all such modifications and equivalent structures and functions.

This application claims the benefit of Japanese Patent Application No. 2023-144757, filed Sep. 6, 2023, which is hereby incorporated by reference herein in its entirety.

What is claimed is:

1. An image forming apparatus comprising:

an imager configured to print at least one image on one or more sheets;

a sheet feeder configured to feed the one or more sheets to the imager via a sheet conveyance path from a sheet feed tray configured to stack the one or more sheets;

a blower configured to blow air onto the one or more sheets stacked on the sheet feed tray;

a sensor provided along the sheet conveyance path and configured to detect a sheet type of the one or more sheets; and a processor configured to set whether to blow the air from the blower before the sensor detects the sheet type, wherein the blower blows the air when the sheet feeder feeds a sheet of the one or more sheets before the sensor detects the sheet type, in a case where a setting to blow the air is made by the processor, and wherein the blower does not blow the air when the sheet feeder feeds the sheet before the sensor detects the sheet type, in a case where a setting not to blow the air is made by the processor.

2. The image forming apparatus according to claim 1, wherein, even in the case where the setting not to blow the air is made by the processor, the blower blows the air to the sheet stacked on the sheet feed tray, in a case where the detected sheet type is a first type.

3. The image forming apparatus according to claim 2, wherein the first sheet type is a coated paper.

4. The image forming apparatus according to claim 2, further comprising a display configured to output a warning in a case where the setting not to blow the air is made by the processor, and the type of the sheet detected by the sensor is the first type.

5. The image forming apparatus according to claim 1, wherein, even in the case where the setting to blow the air is made by the processor, the blower does not blow the air to the sheet stacked on the sheet feed tray, in a case where the detected sheet type is a second type.

6. The image forming apparatus according to claim 5, wherein the second sheet type is a plain paper.

7. The image forming apparatus according to claim 1, wherein the sensor detects the sheet type using a detected feature of a sheet of the one or more sheets.

8. A control method for an image forming apparatus including an imager configured to print at least one image on one or more sheets, a sheet feeder configured to feed the one or more sheets to the imager via a sheet conveyance path from a sheet feed tray configured to stack the one or more sheets, a blower configured to blow air onto the one or more sheets stacked on the sheet feed tray, a sensor provided along the sheet conveyance path and configured to detect a sheet type of the one or more sheets, and a processor, the control method comprising:

setting, by the processor, whether to blow the air from the blower before the sensor detects the sheet type;

blowing, by the blower, the air when the sheet feeder feeds a sheet of the one or more sheets before the sensor detects the sheet type, in a case where a setting to blow the air is made by the processor; and not blowing, by the blower, the air when the sheet feeder feeds the sheet before the sensor detects the sheet type, in a case where a setting not to blow the air is made by the processor.

9. A non-transitory computer readable storage medium storing a program for causing a computer to perform a control method for an image forming apparatus including an imager configured to print at least one image on one or more sheets, a sheet feeder configured to feed the one or more sheets to the imager via a sheet conveyance path from a sheet feed tray configured to stack the one or more sheets, a blower configured to blow air onto the one or more sheets stacked on the sheet feed tray, a sensor provided along the sheet conveyance path and configured to detect a sheet type of the one or more sheets, and a processor, the program causing the control method to:

set, by the processor, whether to blow the air from the blower before the sensor detects the sheet type;

blow the air by the blower when the sheet feeder feeds a sheet of the one or more sheets before the sensor detects the sheet type, in a case where a setting to blow the air is made by the processor; and not blow the air by the blower when the sheet feeder feeds the sheet before the sensor detects the sheet type, in a case where a setting not to blow the air is made by the processor.

* * * * *